United States Patent Office 3,273,376
Patented Sept. 20, 1966

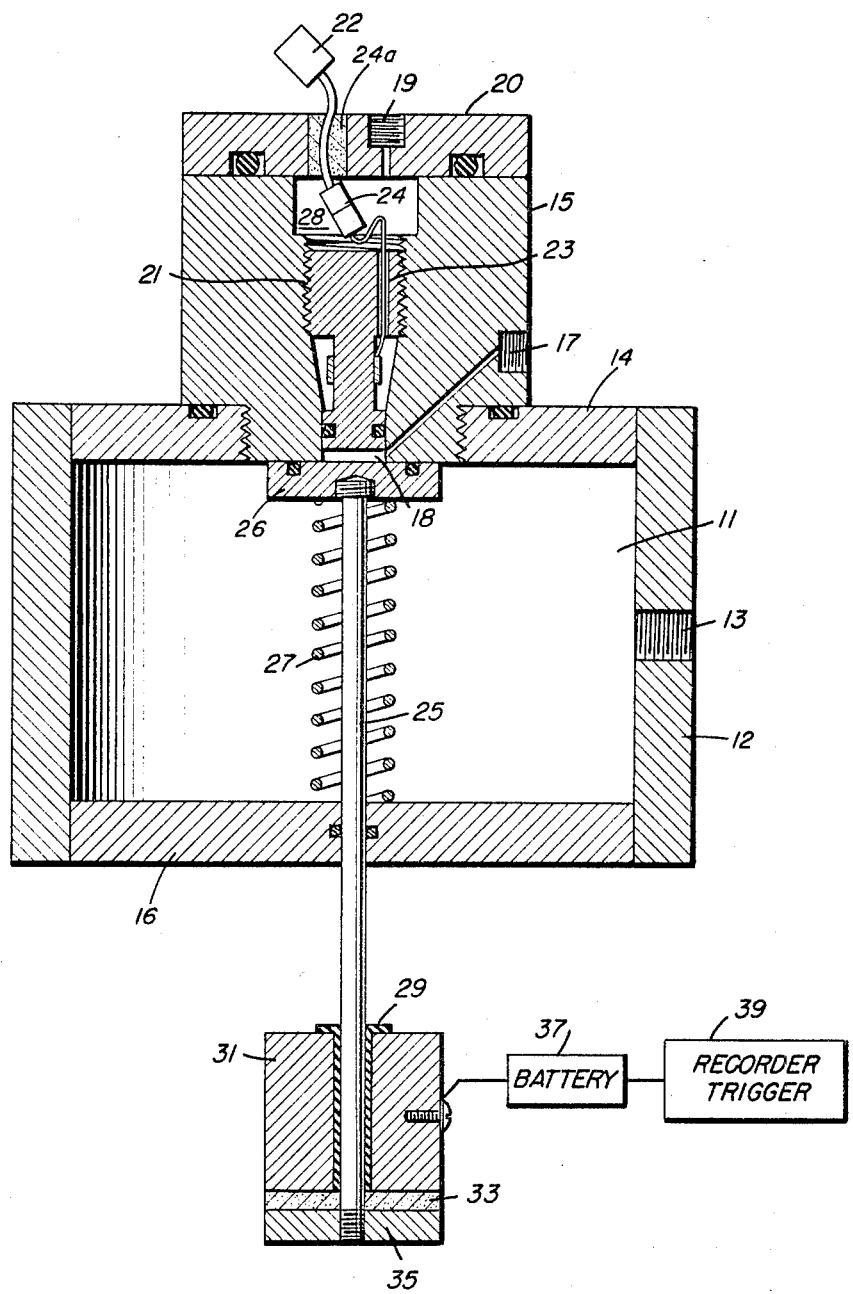

3,273,376
STATIC AND DYNAMIC CALIBRATION VESSEL FOR PRESSURE GAGES
Philip M. Aronson and Robert H. Waser, Silver Spring, Md., assignors to the United States of America as represented by the Secretary of the Navy
Filed Oct. 30, 1964, Ser. No. 407,936
5 Claims. (Cl. 73—4)

The invention described herein may be manufactured and used by or for the Government of the United States of America for governmental purposes without the payment of any royalties thereon or therefor.

This invention relates to a calibration vessel for pressure gages and more particularly to a calibration device for making static and dynamic calibration tests on pressure gages.

In the past, gages were calibrated by bursting a diaphragm separating the gage to be calibrated from the large pressurized chamber. The gage cavity was made small in order to prevent formation of shocks. Disadvantages of the old method were that the rise time of the pressure pulse as detected by the gage especially at lower calibration pressures, was too long to get a truly dynamic calibration. Also, diaphragm particle impinge upon the gage causing erroneous output signals. Another disadvantage was that the diaphragm had to be replaced after each calibration run which was a time consuming procedure.

In the design of the instant invention, the rupturable diaphragm used in gage calibration is replaced by the poppet type valve. Provision is also made either to evacuate or pressurize the volume surrounding the gage to enable simulation of actual operating conditions. Additionally, a switch is provided to electrically trigger a recording system at the time that the calibration of the gage is made. In the present invention a gage to be calibrated is assembled into a calibration vessel and separated from the main chamber of the vessel by a poppet valve. When pressure from the main chamber is applied to the gage by dropping an impact weight which is attached through a rod to the poppet valve thus releasing the valve and applying the pressure of the main chamber to the gage to be calibrated.

It is an object of this invention to provide a reuseable calibration assembly for dynamic and static calibration of pressure gages.

It is another object to provide a calibration vessel for a gage in which a poppet valve is used to obtain dynamic pressure calibration characteristics of the gage.

It is a further object of this invention to provide a dynamic calibration of a pressure gage by dropping an impact weight.

It is still another object of this invention to provide pressure gage calibration apparatus in which the pressure rise time at low pressures is sufficiently rapid to give a truly dynamic calibration.

It is still another object of this invention to provide an apparatus for dynamic calibration of pressure gages in which cavity oscillations during dynamic calibrations are eliminated.

It is still a further object of this invention to provide a calibration apparatus in which an external trigger is provided for a recording system.

Other objects and many of the attendant advantages of this invention will be readily appreciated as the same becomes better understood by reference to the detailed description when considered in connection with the accompanying drawing wherein:

The single drawing illustrates a cross-section of the calibration apparatus of this invention.

Referring now to the drawing, a generally cylindrical main chamber 11 is formed by a cylindrical wall 12 having a port 13 which may be connected to a pressure line, an upper portion of plate 14 and a lower portion or plate 16. A changeable gage fixture 15 is shown threadedly engaged with upper end plate 14. The changeable gage fixture 15 is provided with ports 17 and 19. A pressure gage 21 to be calibrated is shown as threadedly engaged in the gage fixture 15 which is provided with a lower plate or top portion 20. Gage 21 is shown as having cylindrical hole 23 to provide for running an electrical wire or cable from the gage to an inner connector 24. Vacuum seal 24a is provided for the wire or cable leading from the gage to outer connector 22. A second chamber 18 is provided between gage 21 and chamber 11 and a third chamber 28 is provided between top portion 20 and gage 21. A shaft 25 is connected to poppet valve 26. Valve 26 is spring loaded in a closed position against the upper end plate 14 of chamber 11 by a spring 27. An insulating bearing 29 is provided between shaft 25 and impact weight 31 and an impact cushion 33 made of electrical conducting material is provided between the impact weight 31 and a bottom member 35 which is fixedly attached to shaft 25. A battery 37 may be connected to the impact weight and to a recorder trigger 39. Sealing means such as O-rings may be provided between moveable fastened parts of the calibration apparatus. More specifically, O-ring seals may be provided between the lower end plate 16 and shaft 25, and also on the surface of the poppet valve to provide a seal between the chamber 18 and main chamber 11. Seals may also be provided between the upper end plate 14 and the changeable gage fixture 15 as well as between top portion 20 and the main portion of the gage fixture 15. Port 17 is pneumatically connected to chamber 18 and port 19 is pneumatically connected to chamber 28.

In operation, when the gage is to be calibrated, it is first assembled into the calibration vessel 15. The first or main chamber is then pressurized with a fluid to any desired pressure through port 13 which pressure may be measured by a standard pressure gage. For dynamic calibrations, ports 17 and 19 are opened to bring chambers 18 and 28 surrounding the gage to the ambient pressure at which the gage is used and then they may be sealed. The impact weight 31 is then raised and allowed to fall on the impact cushion 33, causing poppet valve 26 to open and to apply calibrating pressure from the main chamber to the gage and simultaneously to close the battery circuit to the recorder trigger 39 to activate a recording system, not shown. Subsequent dynamic calibrations may be made simply by opening port 17 to the ambient pressure, resealing it and dropping the impact weight again. The pressure at which the gage is calibrated is the difference between the pressures at port 17 before opening the poppet valve and at port 13 after opening the poppet valve. Since the volume of the main chamber is in the order of a thousand times that between the poppet valve and the gage, the pressure at port 13 may be read before or after opening the valve for calibration within an error of only 0.1%. Static calibrations are made by first inserting the poppet valve lock and sealing port 17. Ports 13 and 19 are then opened to ambient pressure. Finally, port 19 is sealed and the main chamber is pressurized to the desired pressure through port 13. The calibration pressure is the difference in pressures at ports 13 and 19. For static pressure calibration, a spacer, not shown, may be placed between the lower end plate 16 and impact weight 31 to keep poppet valve 26 open.

Obviously many modifications and variations are possible in the light of the above teachings. It is therefore to be understood that within the scope of the appended claims, the invention may be practiced otherwise than as specifically described.

What is claimed as new and desired to be secured by Letters Patent of the United States is:

1. Apparatus for a static and dynamic calibration of pressure gages comprising:
    a main pressure chamber having a cylindrical wall portion, a flat top portion and a flat bottom portion,
    a cylindrical sleeve having a coaxial portion therein, said sleeve being mounted on said top flat portion such that the hole portion of said sleeve is in communication with the said main pressure chamber,
    means within the hole portion of said cylindrical sleeve for mounting a test pressure gage therein,
    port means in said main chamber, poppet valve means within said main chamber and abutting said cylindrical sleeve in the area of said hole portion such that a second chamber is provided between a test pressure gage and said poppet valve and a seal is provided between said main pressure chamber and said second chamber,
    a cover portion on said sleeve forming a chamber between said cover portion and a pressure gage,
    a second port means pneumatically connected to said second chamber,
    third port means pneumatically connected to said third chamber,
    means resistively urging said poppet valve against said cylindrical sleeve,
    means for moving said poppet valve away from said cylindrical sleeve whereby the pressure from said main chamber may be applied to said test pressure gage and said test pressure gage may be calibrated.

2. Apparatus for calibrating pressure gages comprising:
    an enclosure having a cylindrical sidewall, an upper end plate and a lower end plate, said enclosure having a main chamber within,
    sleeve means mounted on said upper plate for holding a pressure gage to be tested in communication with said main chamber,
    poppet valve means, said poppet valve means being resiliently urged against upper plate whereby a seal is formed between said main chamber and said pressure gage and whereby a second chamber is formed between said pressure gage and said poppet valve,
    first port means connecting said main chamber to a standard pressure,
    second port means connecting said second chamber to a desired pressure, a cover plate mounted on the upper end of said sleeve forming a third chamber between said pressure gage and said cover plate,
    third port means connecting said third chamber to a desired pressure,
    rod means attached to said poppet valve and extending through the lower plate of said enclosure and slideable therewith,
    bottom plate means attached to said rod means,
    a weight slideably mounted on said rod whereby said poppet valve may be opened by lifting said weight and dropping said weight upon said bottom plate.

3. Apparatus as in claim 2 in which said resilient means is a helical compression spring disposed around said rod means and pressing at one end against said poppet valve and at the other end against said lower plate.

4. Apparatus for calibrating pressure gages comprising:
    a main pressure chamber formed by a cylindrical wall, an upper end plate, and a lower end plate,
    a gage fixture mounted on said upper plate, said gage fixture having a cylindrical hole in communication with said main chamber,
    a flat valve plate within said main pressure chamber,
    shaft means projecting through said lower end plate and threadedly secured at one end to said valve means,
    a compression spring surrounding said shaft, said compression spring pressing said valve against one end of the cylindrical hole in said gage fixture whereby a second chamber is formed between said pressure gage and said valve,
    a second port means connecting said second chamber to a source of external pressure,
    a top plate on said sleeve forming a third chamber between said pressure gage and said top plate,
    third port means connecting said third chamber to a source of external pressure,
    an electrical output circuit connected to said pressure gage,
    hole means in said top portion for allowing said electrical connectors to project through said fixture,
    sealing means for sealing said electrical wires in said top portion,
    an impact weight slideably mounted on said shaft and electrically insulated therefrom,
    a plate fixedly attached to the bottom end of said shaft whereby said impact weight may be raised and lowered to open said poppet valve and apply the pressure within said chamber to said pressure gage whereby said pressure gage may be calibrated,
    electrical recording trigger means connected to said impact weight means.

5. Apparatus for calibrating pressure gages as in claim 4 in which said electrical recording trigger means comprises an electrically conductive cushion between impact weight and said bottom plate, battery means connected between said impact weight and a recorder, whereby said recorder may be energized when said impact weight is dropper.

References Cited by the Examiner
UNITED STATES PATENTS
3,034,332  5/1962  Lederer _____ 73—4

LOUIS R. PRINCE, *Primary Examiner.*

S. C. SWISHER, *Assistant Examiner.*